(12) United States Patent
Kanno

(10) Patent No.: US 9,694,395 B2
(45) Date of Patent: Jul. 4, 2017

(54) LIQUID SPRAY DEVICE

(71) Applicant: Minoru Kanno, Sendai (JP)

(72) Inventor: Minoru Kanno, Sendai (JP)

( * ) Notice: Subject to any disclaimer, the term of this patent is extended or adjusted under 35 U.S.C. 154(b) by 0 days.

(21) Appl. No.: 14/413,841

(22) PCT Filed: Sep. 5, 2013

(86) PCT No.: PCT/JP2013/073896
§ 371 (c)(1),
(2) Date: Jan. 9, 2015

(87) PCT Pub. No.: WO2014/077020
PCT Pub. Date: May 22, 2014

(65) Prior Publication Data
US 2015/0165486 A1    Jun. 18, 2015

(30) Foreign Application Priority Data

Nov. 14, 2012  (JP) ................................. 2012-249840

(51) Int. Cl.
*B08B 3/02*    (2006.01)
*B05B 7/10*    (2006.01)
(Continued)

(52) U.S. Cl.
CPC ................ *B08B 3/02* (2013.01); *B05B 7/061* (2013.01); *B05B 7/0876* (2013.01);
(Continued)

(58) Field of Classification Search
CPC ............................. B05B 7/061; B05B 7/0408
(Continued)

(56) References Cited

U.S. PATENT DOCUMENTS 4,195,692 A    4/1980  Dion-Biro
5,957,387 A *  9/1999  Porta .................... B05B 1/1618
                                              239/310
(Continued)

FOREIGN PATENT DOCUMENTS

JP    A-2003-320278    11/2003
JP    A-2004-141800     5/2004
(Continued)

OTHER PUBLICATIONS

Jan. 27, 2016 Office Action issued in Chinese Patent Application No. 201380034993.8.
(Continued)

*Primary Examiner* — Harry D Wilkins, III
(74) *Attorney, Agent, or Firm* — Oliff PLC

(57) ABSTRACT

A liquid spray device prevents diffusion of a poisonous gas and odor in a sprayed liquid. A base includes an ejection orifice for ejecting acidic water, first and second feed paths communicating with ejection and spray orifices to feed acidic and alkaline water, respectively. The second feed path is open so that its front end continuously makes a circuit on the side surface of the base. A rotary part is disposed to rotate along the side surface of the base. The rotary part includes the spray orifices disposed to surround the periphery of the ejection orifice. The rotary part includes communication paths communicating with the respective spray orifices and the second feed path. The respective spray orifices spray alkaline water while rotating around the periphery of the ejection orifice to surround the periphery of acidic water ejected from the ejection orifice with the alkaline water in a curtain-like manner.

1 Claim, 2 Drawing Sheets

(51) Int. Cl.
  *B05B 7/06* (2006.01)
  *C02F 1/461* (2006.01)
  *B05B 7/08* (2006.01)
  *C25B 1/00* (2006.01)

(52) U.S. Cl.
  CPC .............. *C02F 1/4618* (2013.01); *C25B 1/00* (2013.01); *C02F 2001/4619* (2013.01); *C02F 2001/46185* (2013.01)

(58) Field of Classification Search
  USPC .................................................. 239/243, 245
  See application file for complete search history.

(56) References Cited

U.S. PATENT DOCUMENTS

| | | | | |
|---|---|---|---|---|
| 6,148,536 | A * | 11/2000 | Iijima | ...................... B01D 1/20 239/404 |
| 2007/0278195 | A1 | 12/2007 | Richerzhagen et al. | |
| 2011/0253549 | A1 | 10/2011 | Kanno | |
| 2011/0315792 | A1 * | 12/2011 | Gilpatrick | ................ B05B 1/14 239/526 |
| 2013/0068852 | A1 | 3/2013 | Wurz et al. | |

FOREIGN PATENT DOCUMENTS

| | | |
|---|---|---|
| JP | B1-4348405 | 10/2009 |
| JP | A-2010-201081 | 9/2010 |
| JP | 2011-230075 A | 11/2011 |
| JP | 2012/077918 A * | 4/2012 |
| WO | 2011/124686 A1 | 10/2011 |

OTHER PUBLICATIONS

Dec. 3, 2013 Search Report issued in International Patent Application No. PCT/JP2013/073896.
Oct. 9, 2015 Extended European Search Report issued in European Patent Application No. 13854546.2.
Aug. 18, 2016 Office Action issued in Chinese Patent Application No. 201380034993.8.

* cited by examiner

LIQUID SPRAY DEVICE

TECHNICAL FIELD

The present invention relates to a liquid spray device.

BACKGROUND ART

Conventionally, as cleaning water for carrying out sterilization, disinfection, and the like, acidic water, ozone water, and the like are being used. When a chloride salt aqueous solution is electrolyzed to generate acidic water, there has been produced a problem that due to chlorine contained in the acidic water, an odor of chlorine is generated and then the odor is diffused in the environment together with poisonous chlorine gas. Further, also when ozone water is used, a problem that poisonous ozone gas is generated and then its odor is diffused in the environment similarly has been produced. Therefore, to prevent diffusion and an odor of poisonous gas generated from such cleaning liquid, liquid spray devices for spraying deodorant mist or water to surround the periphery of the cleaning water have been developed (see, for example, Patent Literature 1 or 2).

CITATION LIST

Patent Literature

PTL 1: Japanese Patent Publication No. 4348405
PTL 2: Japanese Laid-open Patent Publication No. 2003-320278

SUMMARY OF INVENTION

Technical Problem

The liquid spray device described in PTL 1 can realize deodorization by spraying deodorant mist of alkaline water so as to surround acidic water, but it is conceivable that an odor of chlorine may leak in the environment depending on a spray amount of the mist and an ejection amount of the acidic water. Further, since the liquid spray device described in PTL 2 includes a plurality of auxiliary spray orifices so as to surround the periphery of cleaning water, a gap is created between water and water sprayed from the auxiliary spray orifices adjacent to each other. Therefore, there has been produced a problem that ozone gas contained in the cleaning water is scattered in the environment from the gap.

In view of such problems, the present invention has been completed, and an object of the present invention is to provide a liquid spray device highly effectively preventing a poisonous gas and an odor contained in a liquid to be sprayed from diffusing in the environment.

Solution to Problem

To achieve the aforementioned object, a liquid spray device according to the present invention includes an ejection orifice for ejecting a first liquid and a plurality of spray orifices capable of spraying a second liquid so as to surround the periphery of the first liquid ejected from the ejection orifice while rotating around the ejection orifice as the center, the plurality of spray orifices being disposed so as to surround the periphery of the ejection orifice.

In the liquid spray device according to the present invention, when the first liquid is ejected from the ejection orifice, the plurality of spray orifices disposed so as to surround the periphery of the ejection orifice sprays the second liquid while rotating around the ejection orifice as the center, and therefore the second liquid is able to surround the periphery of the first liquid. Since the plurality of spray orifices sprays the second liquid while rotating, the periphery of the first liquid is able to be surrounded more uniformly and densely than in the case of no rotation. Therefore, when the first liquid contains a poisonous gas having an odor, the second liquid is able to effectively prevent diffusion of the poisonous gas and the odor in the environment. Examples of the first liquid and the second liquid include acidic water and alkaline water, ozone water and tap water, disinfected water and tap water, and hot water and cool water, respectively.

It is possible that the liquid spray device according to the present invention is configured so that an ejection orifice rotates together with each spray orifice or the ejection orifice does not rotate and only the respective spray orifices rotate. However, the respective spray orifices are preferably configured so as to spray the second liquid while rotating around the periphery of the ejection orifice. It is possible that the respective spray orifices are configured so as to rotate with a water pressure of the second liquid sprayed or with a power of a motor or the like. The respective spray orifices are preferably configured so as to spray the second liquid in a curtain-like or mist-like manner. Especially in the case where the respective spray orifices spray the second liquid in a curtain-like manner, when the first liquid contains a poisonous gas having an odor, diffusion of the poisonous gas and the odor in the environment is able to be more effectively prevented.

The respective spray orifices are preferably directed in the same direction as the ejection orifice, but the direction of each spray orifice may be changeable. The respective spray orifices are preferably disposed so as to concentrically surround the periphery of the ejection orifice as the center. Further, it is possible that the respective spray orifices are disposed on two or at least three concentric circles around the ejection orifice as the center. Regarding the plurality of spray orifices, any number, which is at least two, of spray orifices may be employable. In the case of two spray orifices, being disposed so as to sandwich the ejection orifice means being disposed so as to surround the periphery of the ejection orifice.

In the liquid spray device according to the present invention, preferably, the first liquid comprises acidic water and the second liquid comprises alkaline water, and specifically preferably, the first liquid comprises strong acidic water and the second liquid comprises strong alkaline water. It is possible that the first liquid comprises cleaning water and the second liquid comprises a deodorant. It is possible that the liquid spray device according to the present invention includes a heater for heating the first liquid. In this case, when the first liquid is water, heating makes it possible to enhance a cleaning effect. Further, it is possible to provide a cooler for cooling the second liquid. In this case, when the second liquid is water, cooling makes it possible to enhance a deodorant effect.

Preferably, the liquid spray device according to the present invention includes a base and a rotary part, in which the base includes the ejection orifice, a first feed path, and a second feed path; the first feed path communicates with the ejection orifice so as to feed a first liquid; the second feed path communicates with each spray orifice so as to feed a second liquid; the rotary part includes the respective spray orifices; and the respective spray orifices are rotatably disposed in the base so as to rotate around the periphery of the ejection orifice while communicating with the second feed path.

In the liquid spray device according to the present invention, it is possible that the ejection orifice ejects the first liquid in a straight manner or a shower-like manner or by switching the straight manner and the shower-like manner. The respective spray orifices preferably have a shape spraying the second liquid in a fan-like manner so that the second liquid widely spreads in a curtain-like manner when the respective spray orifices spray the second liquid while rotating around the periphery of the ejection orifice.

The liquid spray device according to the present invention preferably includes electrolyzed water generation means capable of generating acidic water and alkaline water by electrolyzing an electrolyte aqueous solution, feeding the generated acidic water to the first feed path, and feeding the generated alkaline water to the second feed path.

In this case, the alkaline water surrounds the periphery of the acidic water, and thereby diffusion of an odor of the acidic water becomes preventable. When, for example, a chloride salt aqueous solution is electrolyzed and then generated acidic water is used, an odor of chlorine is generated from the acidic water. However, the alkaline water is able to prevent the odor of chlorine. In addition, poisonous chlorine gas is able to be neutralized to be harmless.

The liquid spray device according to the present invention is usable for sterilization devices, drainage devices, coating devices, and the like, in addition to cleaning devices.

Advantageous Effects of Invention

According to the present invention, a liquid spray device highly effectively preventing a poisonous gas and an odor contained in a liquid to be sprayed from diffusing in the environment can be provided.

DESCRIPTION OF EMBODIMENTS

The embodiment of the present invention will now be described with reference to the accompanying drawings.

Figure 1:
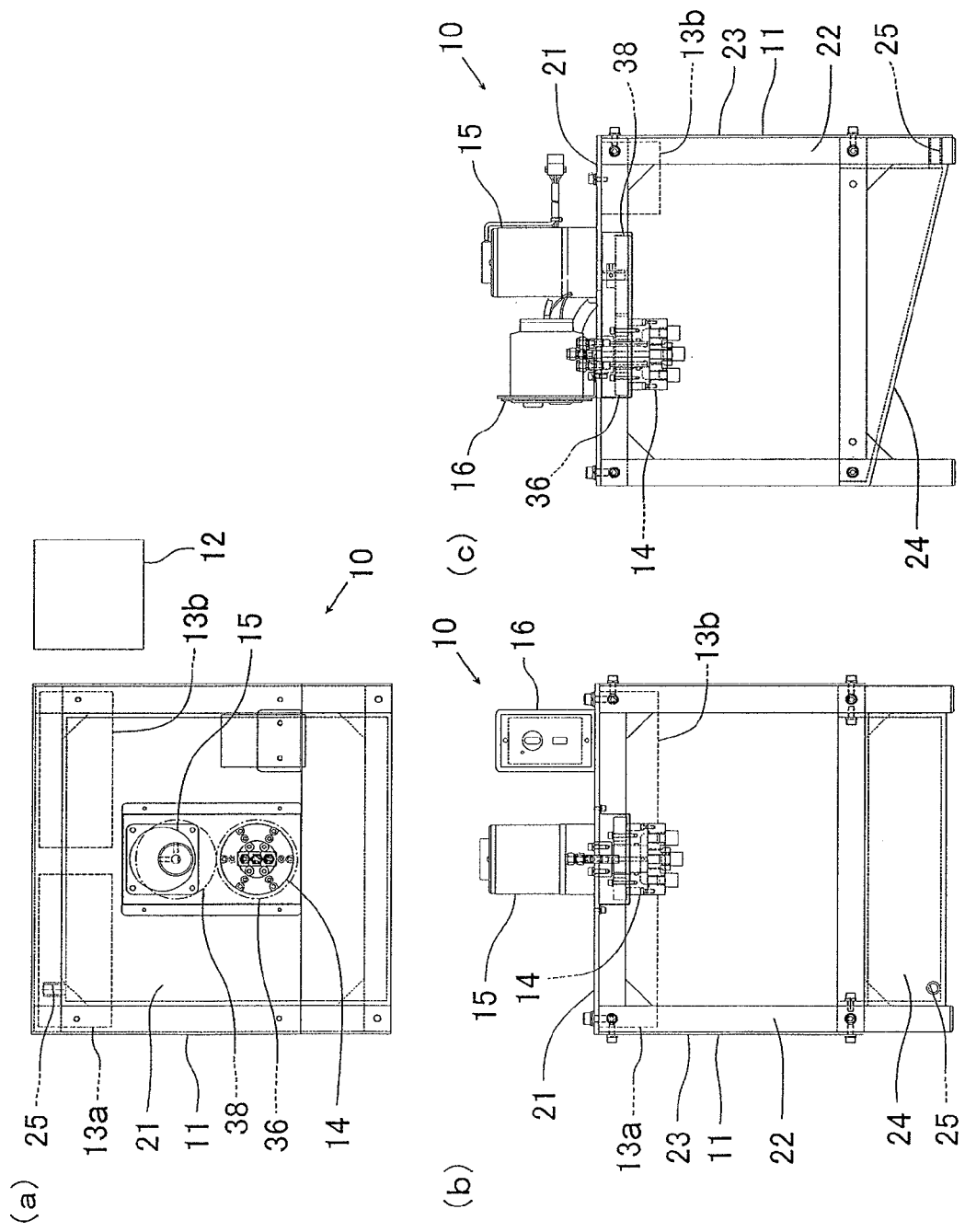
FIG. 1 contains (a) a plan view, (b) a front view, and (c) a right-side view of a liquid spray device of an embodiment of the present invention.
Figure 2:
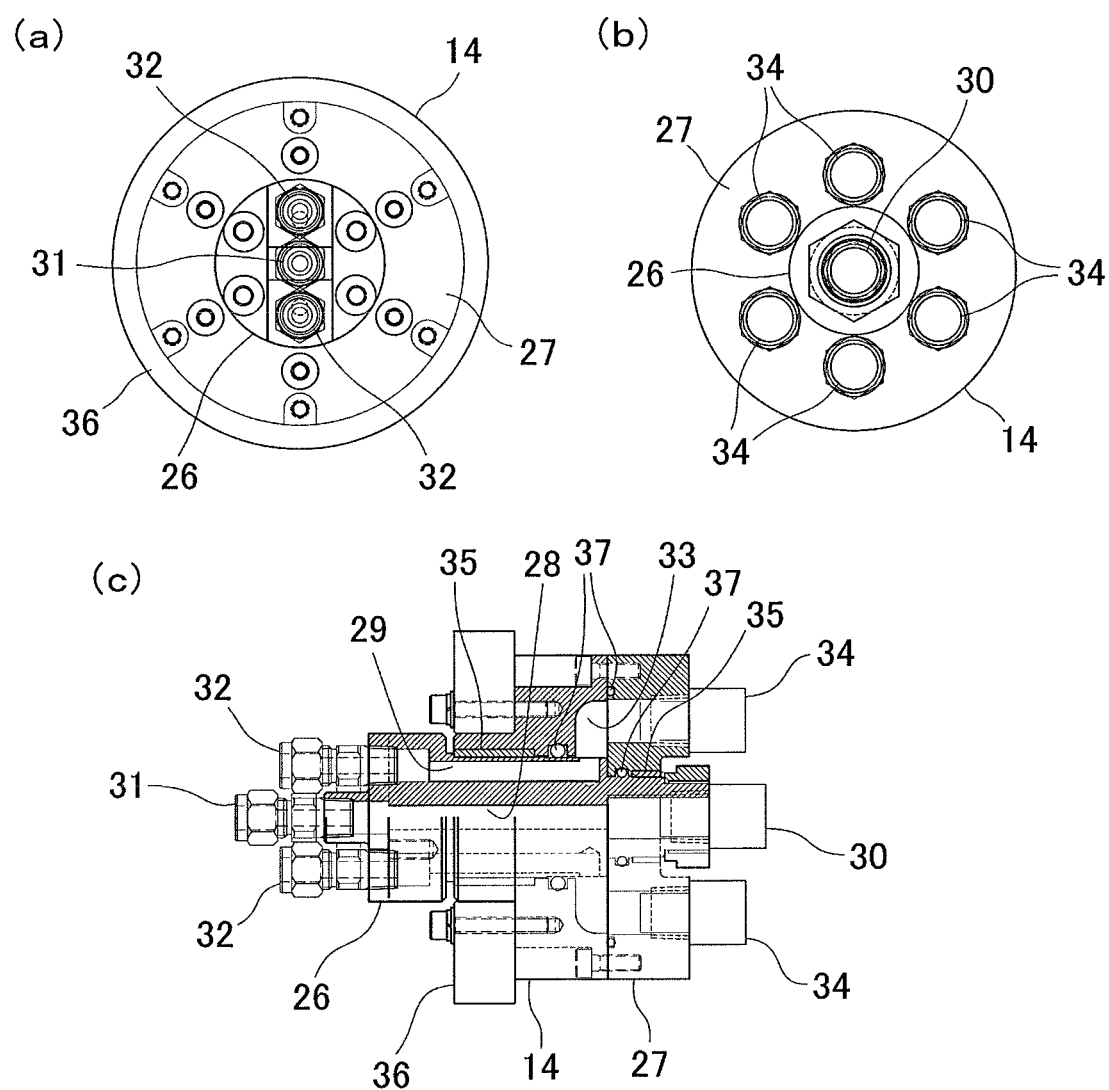
FIG. 2 contains (a) a plan view, (b) a bottom view, and (c) a partially cut-out side view of an ejection nozzle of the liquid spray device illustrated in FIG. 1.

FIG. 1 and FIG. 2 illustrate the liquid spray device of the embodiment of the present invention.

As illustrated in FIG. 1, a liquid spray device 10 includes a support 11, electrolyzed water generation means 12, a pump 13, an ejection nozzle 14, a motor 15, and a control box 16.

The support 11 includes a mounting plate 21, a leg 22 having a frame shape for holding the mounting plate 21 at a predetermined height, a cover 23 for covering the space of the frame of the leg 22, a drainage plate 24 mounted in the leg 22 so as to cover the bottom portion of the mounting plate 21 and to be inclined backward, and a drainage hole 25 disposed so as to continuously lead to the bottom end of the inclination of the drainage plate 24.

The electrolyzed water generation means 12 is disposed beside the support 11 and configured so as to generate acidic water (a first liquid) and alkaline water (a second liquid) by electrolyzing an electrolyte solution such as a sodium chloride aqueous solution and the like. The pumps 13a and 13b are formed with two pumps; and are fixed to the under surface of the mounting plate 21 in the back and configured so as to feed acidic water generated by the electrolyzed water generation means 12 to an acidic water joint 31 of the ejection nozzle 14 through an acidic water conveyance pipe (not illustrated) and to feed alkaline water generated by the electrolyzed water generation means 12 to an alkaline water joint 32 of the ejection nozzle 14 through an alkaline water conveyance pipe (not illustrated).

As illustrated in FIG. 2, the ejection nozzle 14 includes a base 26 that is elongated and has a circularly shaped outer diameter in the cross-section and a rotary part 27 of a circular ring shape that is thinner than a length of the base 26. The base 26 includes a first feed path 28 and a second feed path 29. The first feed path is disposed in the center of the base 26 so as to penetrate from its front end to its rear end in the longitudinal direction. The second feed path 29 is disposed so as to extend in the longitudinal direction of the base 26 in a circular ring-like manner in the periphery of the first feed path 28. The second feed path 29 is open to the side surface of the base 26 so that the end portion of the front end side of the path continuously makes a circuit on the side surface of the base 26. Further, the second feed path 29 has two openings in the rear end of the base 26. The base 26 includes an ejection orifice 30 in its front end. The ejection orifice 30 communicates with a front end opening of the first feed path 28. In the rear end of the first feed path 28, the acidic water joint 31 is mounted. Further, in the base 26, in each of the two openings of the rear end of the second feed path 29, the alkaline water joint 32 is mounted.

The rotary part 27 includes a plurality of communication paths 33 extending in a crank-like manner and penetrating from the inner peripheral surface to the end surface of the front end side. The respective communication paths 33 are disposed at equal angle intervals with respect to the center axis of the rotary part 27. The rotary part 27 includes a plurality of spray orifices 34. The respective spray orifices 34 communicate with an opening of the end surface side of the respective communication paths 33. The spray orifice is directed in the same direction as the ejection orifice 30. A front end portion of the base 26 is inserted inside the rotary part 27 which is rotatably disposed along the side surface of the base 26. The rotary part 27 is mounted in the base 26 via a slide bearing 35 so as to rotate smoothly. The rotary part 27 is fixed with a spur bearing 36 along the outer periphery of the rear end and configured so as to rotate by rotating this spur bearing 36.

Further, the rotary part 27 is mounted so that an opening of the inner peripheral surface side of the respective communication paths 33 is located in the opening of the second feed path 29 in the side surface of the base 26. In the rotary part 27, the opening of the inner peripheral surface side of the respective communication paths 33 communicates with the second feed path 29 of the base 26 even during rotation. In this manner, the respective spray orifices 34 are disposed so as to concentrically surround the periphery of the ejection orifice 30 as the center and is rotatable around the periphery of the ejection orifice 30 as the center. Herein, in a specific example illustrated in FIG. 2, the spray orifice 34 and the communication path 33 are formed with six spray orifices and six communication paths each but possibly with any number, at least two, thereof each.

In the ejection nozzle 14, the acidic water conveyance pipe is connected to the acidic water joint 31 and the alkaline water conveyance pipe is connected to the alkaline water joint 32. The ejection nozzle 14 ejects acidic water conveyed from the pump 13a from the ejection orifice 30 by passing through the acidic water joint 31 and the first feed path 28. Further, the ejection nozzle 14 sprays alkaline water conveyed from the pump 13b from the respective spray orifices 34 by passing through the alkaline water joint 32, the second feed path 29 and the respective communication paths 33. Herein, the ejection nozzle 14 is mounted with each member by placing an O-ring in a boundary portion so that the alkaline water does not leak from an interspace between members such as a boundary between the base 26 and the rotary part 27.

As illustrated in FIG. 1, the ejection nozzle 14 is fixed to the front portion of the center of the mounting plate 21 so as to eject acidic water downward. The ejection orifice 30 is capable of ejecting the acidic water in a straight manner or a shower-like manner. The respective spray orifices 34 are capable of spraying alkaline water in a fan-like manner so that the alkaline water spreads in the rotation direction of the rotary part 27. The ejection nozzle 14 is configured so as to rotate the rotary part 27 to spray the alkaline water while the respective spray orifices 34 rotate around the periphery of the ejection orifice 30. Thereby, the ejection nozzle 14 is configured so as to cover the periphery of the acidic water ejected from the ejection orifice 30 with the alkaline water in a curtain-like manner.

The motor 15 is fixed to the center of the mounting plate 21 in the back along with the ejection nozzle 14. The motor 15 includes a spur gear 38 and is configured so as to rotate this spur gear 38. The spur gear 38 of the motor 15 meshes with the spur gear 36 of the rotary part 27. Thereby, the motor 15 is capable of rotating the rotary part 27 via the spur gear 38. The control box 16 is fixed to the side of the center of the mounting plate 21 beside the ejection nozzle 14. The control box 16 is capable of controlling the movement of the motor 15 such as ON/OFF of the motor 15, rotation speed, and so forth. The motor 15 is automatically switched on and off in accordance with ON/OFF of the switch of the electrolyzed water generation means 12.

Next, operations will now be described.

The liquid spray device 10 is used as a cleaning device as follows. Initially, the switch is turned on and then acidic water and alkaline water generated by the electrolyzed water generation means 12 is fed to the ejection nozzle 14 using the pumps 13a and 13b, respectively. The acidic water is ejected from the ejection orifice 30 and at the same time, the alkaline water is sprayed in a fan-like manner from the respective spray orifices 34 disposed so as to surround the periphery of the ejection orifice 30. Sterilization/cleaning is able to be carried out with the acidic water ejected from the ejection orifice 30. At that time, the control box 16 automatically drives the motor 15 to rotate the rotary part 27. This makes it possible that with ejection of the acidic water from the ejection orifice 30, the respective spray orifices 34 spray the alkaline water while rotating around the periphery of the ejection orifice 30 as the center and then the alkaline water surrounds the periphery of the acidic water in a curtain-like manner.

The liquid spray device 10 sprays alkaline water while a plurality of spray orifices 34 rotates and therefore is able to surround the periphery of acidic water by curtain-like alkaline water more uniformly and densely with substantially no gap than in the case of no rotation. Further, since being sprayed in a fan-like manner, the alkaline water spreads more widely in a curtain-like manner and thereby, a gap is able to be eliminated more effectively. This makes it possible to effectively prevent chlorine gas and its odor contained in the acidic water from diffusing in the environment with the alkaline water. Further, it is possible to neutralize poisonous chlorine gas to be harmless.

The liquid spray device 10 is capable of receiving the ejected acidic water and the sprayed alkaline water using the drainage plate 24 disposed under the ejection nozzle 14. When the electrolyzed water generation means 12 is switched off, ejection of the acidic water from the ejection orifice 30 and spraying of the alkaline water from the respective spray orifices 34 are stopped and then the rotary part 27 is automatically stopped.

REFERENCE SIGNS LIST

10 Liquid spray device
11 Support
  21 Mounting plate
  22 Leg
  23 Cover
  24 Drainage plate
  25 Drainage hole
12 Electrolyzed water generation means
13a, 13b Pump
14 Ejection nozzle
  26 Base
    28 First feed path
    29 Second feed path
    30 Ejection orifice
    31 Acidic water joint
    32 Alkaline water joint
  27 Rotary part
    33 Communication path
    34 Spray orifice
    35 Slide bearing
    36 Spur bearing
  37 O-ring
15 Motor
  38 Spur bearing
  16 Control box

The invention claimed is:

1. A liquid spray device comprising:
an ejection orifice for ejecting a first liquid; and
a plurality of spray orifices for spraying a second liquid so as to surround a periphery of the first liquid ejected from the ejection orifice while rotating around the ejection orifice as a center, the plurality of spray orifices being disposed so as to surround a periphery of the ejection orifice and configured so as to rotate around the periphery of the ejection orifice as a center,
wherein the liquid spray device comprises a base and a rotary part,
the base including the ejection orifice, a first feed path, and a second feed path, the first feed path communicating with the ejection orifice so as to feed the first liquid, the second feed path communicating with the respective spray orifices so as to feed the second liquid,
the rotary part including the respective spray orifices, the respective spray orifices being rotatably disposed in the base so as to rotate around the periphery of the ejection orifice while communicating with the second feed path; and
the liquid spray device further comprising electrolyzed water generation means for generating acidic water and alkaline water by electrolyzing an electrolyte aqueous solution, feeding the generated acidic water to the first feed path, and feeding the generated alkaline water to the second feed path.

\* \* \* \* \*